May 18, 1965  F. ALZANI ETAL  3,183,978
LATERALLY RETRACTABLE AGRICULTURAL IMPLEMENT
Filed July 5, 1962  2 Sheets-Sheet 1
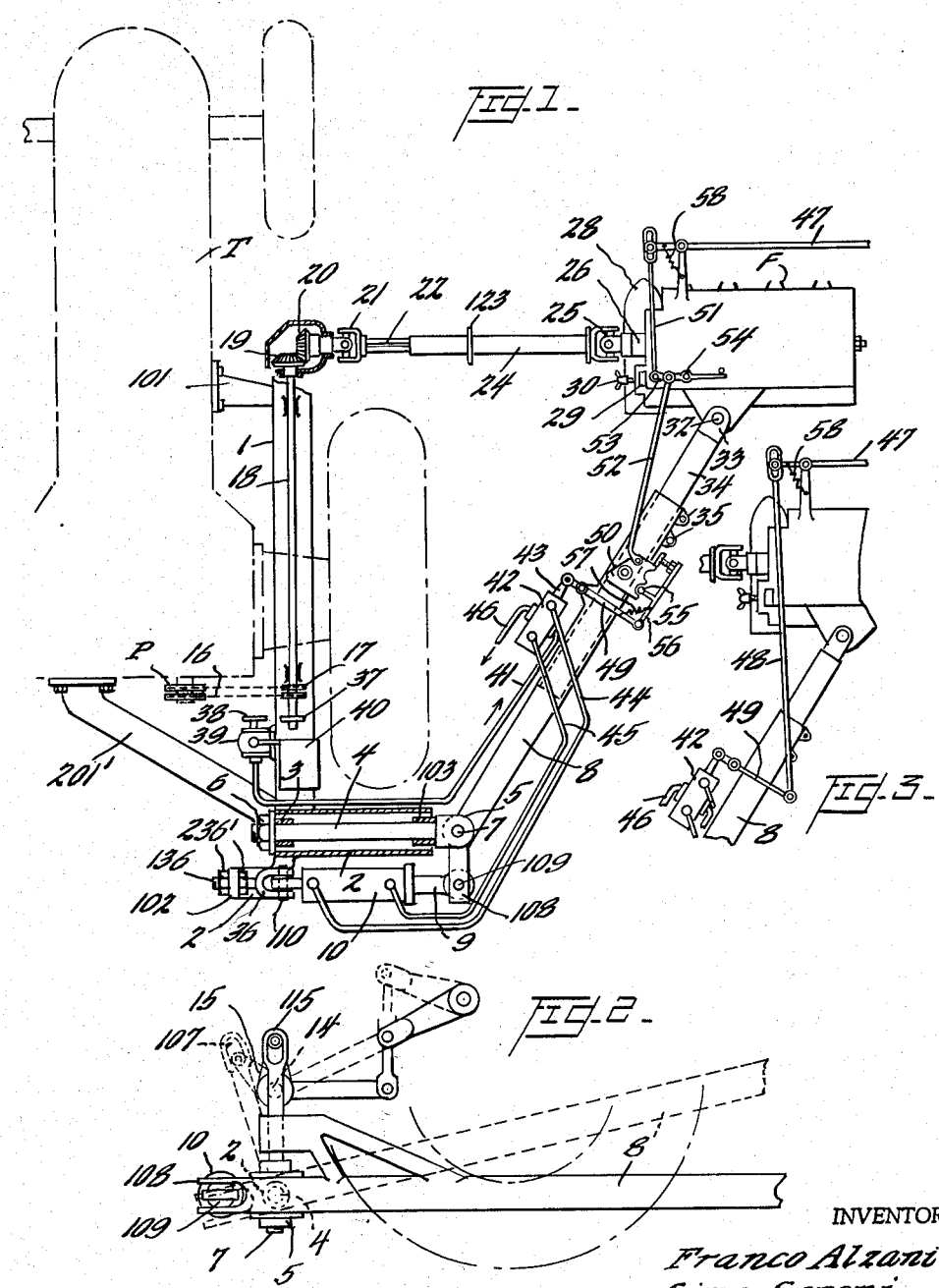
INVENTORS
Franco Alzani
Gino Ceroni,
BY Watson, Cole, Grindle & Watson
ATTORNEYS

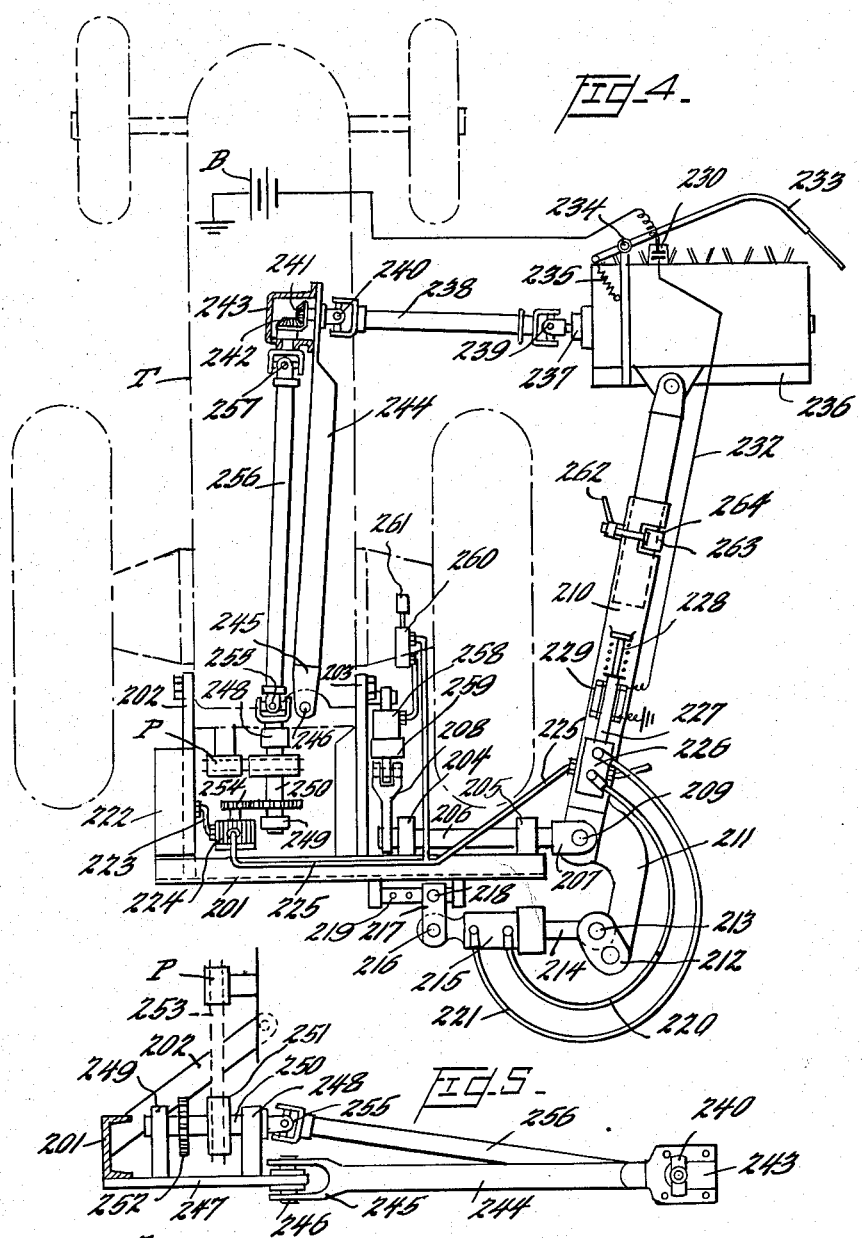

United States Patent Office 3,183,978
Patented May 18, 1965

3,183,978
LATERALLY RETRACTABLE AGRICULTURAL
IMPLEMENT
Franco Alzani and Gino Ceroni, San Martino in Argine, Italy, assignors to Arturo Ansaloni del Dr. Edo Ansaloni, Bologna, Italy, a firm of Italy
Filed July 5, 1962, Ser. No. 207,763
Claims priority, application Italy, July 6, 1961, 12,887/61; May 4, 1962, 9,292/62
3 Claims. (Cl. 172—38)

The impossibility for the strips of soil comprised between the trees of a row to be cultivated with the rigid means as at present in use in agriculture, except for some attempts made without success, is well known. This work is to be performed by hand.

The object of the present invention is to create a pivoted arm device automatically rocking in a horizontal plane and particularly adapted to be applied to the sidewall of agricultural tractors, or to create other traction means having a power take-off, said arm being provided with an agricultural implement, such as a milling cutter, a clod-smasher, a mower and the like, which is operated by the power take-off of the tractor to perform works on the subsequent strips of soil comprised between the trees of a row.

According to the means as known in the art, in order to cultivate these strips, on which there are spaced apart plants, there have been provided semiautomatically controlled rotary cultivators with mechanical devices or hydraulically operated rotary cultivators. But, as already stated, the operation has been unsatisfactory due to the fact that with the mechanical control it will be necessary for the driver to operate in such a way as to return the machine to the working line every time a tree is avoided, whereas in the case of a hydraulic control the inconveniences are due to the wear of the control pistons and to the awkward position of the implement situated behind the operator.

The invention is illustrated by way of example only, without any limitation, on the accompanying drawings in which:

FIGURE 1 is a top view, partly in section, of the device applied to its bearing means;

FIGURE 2 is a side view, partly in section, of the arm lifting device for tractors provided with a lifting arm;

FIGURE 3 is a top view of another lever system;

FIGURE 4 is a top view, partly in section, of the same device as shown in FIGURE 1 with some additional improvements;

FIGURE 5 is a diagrammatic side view of various transmission members for the operation of the device, and FIGURE 6 shows in side view and in section a diagrammatic form of mounting a rotary cultivator on the hollow shaft which facilitates substitution.

As shown on the drawings, the invention concerns a rocking arm device which permits to cultivate a strip of soil having trees thereon, by causing an implement carried by the rocking arm to enter the strip and to be withdrawn or retracted laterally therefrom at every tree met, said cultivation being completed by the to-and-fro movement of the device which is carried by the tractor on both sides of the row.

Consequently, the main feature of the invention resides in the operation of an automatic control brought about by the impact of a sensitive arm or feeler against subsequent trunks of trees which thus are avoided by the implement, whose position of work is in trailing relation with respect to that of the feeler or sensitive arm.

As shown in FIGURE 1, the device is formed from a strong frame comprising a girder 1, a stirrup 101 as well as a cross-bar 201' which are secured to the sidewall of the supporting and towing means exemplified by the tractor T. Girder 1 is preferably arranged parallel to the longitudinal axis of tractor T and is mounted alongside said tractor in a convenient position at the level of one of the rear wheels. At the rear end, near the point of connection of cross-bar 101, girder 1 carries a strong support 2 provided with bushings 3 and 103 in which there rotates shaft 4 provided at one end with fork 5 and retained at the opposite end by a nut 6 and the two jaws forming fork 5 are traversed by a strong pin 7 on which there is articulated the tubular arm 8 extending towards the front part of the towing means.

The tubular arm 8, which is pivoted on pin 7, extends beyond the rear part of the tractor a certain extent 108 having the shape of a fork. To this fork by means of a ball joint 109 there is connected the end of rod 9 of a piston contained in the cylinder 10. The cylinder 10 through a lug 110 is hingedly anchored to fork 36 integral with the strong threaded shank 136, which is secured in the correct position and through the nuts 236' to the connecting piece 102 integral with support 2, thus permitting to change the position of cylinder 10 in respect of the stroke which rod 9 and, consequently, arm 8 operated by it are caused to perform.

The axis of articulation of lug 110 on fork 36 is substantially perpendicular to the axis of the ball joint 109, so that cylinder 10 and rod 9 may follow by a sufficient angle the rotary motions of arm 8 around shaft 4 when arm 8 is to be lifted.

In effect, as it may be noted in FIGURE 2, to lift arm 8 it will be sufficient for the extension of pin 7 to be acted upon by suitable means by causing fork 5 to rotate around the axis of its shaft 4. If the tractor is provided with a lifting arm 11, it will be sufficient for this arm 11 to be connected to lever 13 through tension rod 12 so that together with lever 13 there rotate also the axis 14 and the crank 15, the latter determining the sliding motion of the crank in 115 within the slot 107 provided in the head of pin 7 which, when rotating, lifts arm 8. If the tractor is not provided with the lifting arm 11, the rotary motion of the extension of pin 7, according to another feature of the invention, may be obtained by connecting its end 107 with the rod of a piston capable of sliding upon a fluid pressure control being exerted on it within a cylinder hingedly anchored to the frame of the device according to the invention or to the structure of the tractor.

The operation of the device as shown in FIGURES 1, 2 and 3 is as follows: By starting from the power take-off P, the motion through chain 16 is transmitted to the toothed sprocket wheel 17 keyed on shaft 18 adequately sustained by supports secured to girder 1. On the end turned towards the front part of the towing means, shaft 18 through the pair of bevel wheels 19 and 20 transmits the motion to the grooved shaft 22 with the interposition of a universal joint 21. Shaft 22 slides within a grooved sleeve 23 which by means of flange 123 is coupled to the flanged extension 24. This extension 24 by the interposition of a second universal joint 25 transmits the motion directly or indirectly to the axis 26 which imparts the motion to the implement. Having particularly reference to FIG. 2, the supporting frame 27 of implement F bears on the soil by the interposition of a skid or runner 28 secured to a rod 29 which is secured in a desired position of vertical adjustment by a set screw 30. Said supporting frame 27 of the implement is provided with a bracket 31 by means of which it is hinged to the pin 32 of a fork 33 integral with the tubular body 34. Body 34 is telescopically disposed for sliding inside the arm 8 but is normally secured thereto in a desired position of adjustment by clamping means provided by the split end of the tubular arm 8 together with its associated threaded means 35 which will be understood to operate in a known manner.

The automatic swinging or retraction of arm 8, whose length may be adjusted so as to permit the grooved shaft 22 and the respective Cardan joints 21 and 25 to operate in the most favourable conditions, is caused by pump 39 which preferably drives power shaft 18 by means of gearing 37–38 or by equivalent means. Liquid from a tank 40 flows into pump 39, from which it is delivered by the valve 42 through conduit 41. The valve 42 by means of piston 43 selectively sends the compressed fluid into one of the conduits 44 and 45 while permitting its discharge through conduit 46, so as to laterally swing or project the arm 8 outwardly away from the tractor T to its operative position or to effect its retraction laterally inwardly toward the tractor T. The return conduit 46 connects the distributor with the tank 40. The control of piston 43 is determined by the impact of the rod 47 against a tree or pole which the implement has to avoid. In the normal position of the feeler or control rod 47, when projected forwardly by its spring 58, fluid enters cylinder 42 through conduit 45 to maintain the arm 8 and implement F outwardly projected in normal operating position as shown in full lines in FIGURE 1.

According to a further feature of the invention when it is the question of governing both the speed of control and the outward stroke of arm 8, the control rod or feeler 47 can directly act upon lever 49 which controls the piston 43 by the interposition of only one tension rod 48 (FIGURE 3) or it may act upon said lever 49 by the interposition of a cam 50 which is caused to oscillate by the tension rods 51 and 52 connected to lever 53 hinged in 54 (FIGURE 1). In effect, cam 50, when oscillating, causes roller 55 to enter the grooves provided in said cam, so as to cause lever 56, that is integral with said roller 55, to determine the oscillations of lever 49 which controls the distributor 42. Lever 56, which is hinged to the end of lever 49, is caused to bear on cam 50 of the return spring 57. The return spring 58, in both of the solutions described, takes the lever 47 back to the position of rest.

A further feature resides in the possibility of controlling the stroke of arm 8 by the device as illustrated in FIGURE 3. In this case it will be necessary for the nuts 236' (FIGURE 2) to be acted upon so as to shift fork 36 carrying the fulcrum of cylinder 10. By shifting this fulcrum to the right of the operator, the outward stroke of arm 8 is increasingly limited insofar as the piston, which is integral with rod 9, will strike against the bottom of the cylinder prior to what would happen if the fulcrum would be displaced to the left. Upon having found the correct opening position, arm 8 has to take up a normal operative working position owing to the action of the compressed fluid in conduit 45. When rod 47 strikes against a tree or a plant, piston 43 of the valve 42 causes the fluid to enter conduit 44 so as to cause arm 8 to be momentarily retracted laterally toward and positioned alongside the towing means, whereupon it again moves back into the position of work as soon as rod 47 again takes up its original position.

As particularly illustrated in FIGURES 4 and 5 of the drawings, to the device as shown in FIGURES 1, 2 and 3 there are provided modifications and improvements which, first of all, refer to the transmission of the motion to the implement carried by the oscillating arm, which transmission is performed by the interposition of a second pair of universal joints carried by a second oscillating arm which, together with the other members, forms a polygon hinged to two fulcrums having a substantially vertical axis and secured to the frame of the tractor; secondly, to the control of the fluid distributor determining the horizontal oscillations of the implement when the rod, upon entering into contact with the plants of the row, controls an electric contact which, instead, is obtained by means of a solenoid fed by the accumulator battery of the tractor; thirdly, to the lifting of the implement carrying arm especially in tractors without a lifting arm, which lifting is obtained by a fluid pressure control derived from the same plant by which the horizontal oscillations of said implement carrying arm are controlled. Another feature concerning FIGURES 4 and 5 of the drawings refers to the structure of the frame which is adapted to be provided with the "three points" fastening system firmly applied to the tractors.

As shown in FIGURE 4, all of the members of the device are carried by a girder 201 of adequate resistance, which is horizontally secured to the tractor T by means of arms 202 and 203 and another connecting member (not shown) capable of providing the fastening in "three points" of a common implement. To the girder 201 there are secured the supports 204 and 205 on which there rotates the horizontal shaft 206 provided at one end with fork 207 and at the other end with arm 208. The two jaws of fork 207 are traversed by a strong pin 209 on which there is hinged the tubular arm 210 extending towards the front part of the towing means.

Near the piece traversed by pin 209 the tubular arm 210 is provided with a shaped piece 211 having at the end a fork 212. The jaws of fork 212 are provided each with two holes into which there may be alternately introduced the pin 213 by means of which in the said fork there is engaged the terminal joint on rod 214 of the piston which slides in the cylinder 215, a head of cylinder 215, opposite the rod 214, being provided with a joint which through pin 216 is engaged with the flexible block 217 by means of bolt 218 in the correct position on guide 219 firmly anchored to girder 201.

The two pairs of holes provided on fork 212, to lodge pin 213, as well as the various fastening positions for block 217 on the cylindrical guide 219 are provided for the purpose of varying within suitable limits the amplitude of the stroke of arm 210. The piston in the cylinder 215, which is integral with rod 214, is caused to slide so as to alternately admit a fluid under pressure into conduits 220 and 221. The fluid is contained in a tank 222 from which through a conduit 223 it is supplied to a pump 224 and from the latter through conduit 225 the compressed fluid reaches the distributor 226. Piston 227 of distributor 226 by a spring 228 is always maintained in such a position that the fluid keeps the arm 210 pushed laterally outward to the desired extent.

If in opposition to the action of spring 228 a solenoid 229 provided on arm 10 shifts the piston 227 in such a way as to supply pressure to conduit 221, the rod 214 moves out and the arm 210 approaches the tractor so as to avoid the plant. The control of solenoid 229 is obtained by the closure of switch 230 which by means of lead 231 connects the insulated pole of battery B to the insulated pole of solenoid 229 which, in turn, is connected to switch 230 through lead 232. The closure of switch 230 is performed by the rod 233 hinged to pin 234 and returned into position of rest by a spring 235. The pin 234 is secured to the housing or frame of the implement 236 carried by arm 210 which is connected to a joint. Shaft 237 of the implement 236 is operated by shaft 238 provided at the end with Cardan joints 239 and 240. The movement to the Cardan joint 240 is imparted by the pair of conical wheels 241 and 242 contained in the housing 243 secured to the end of arm 244 which is capable of oscillating horizontally inasmuch as it is provided with a fork 245 hinged to the vertical pin 246. Said vertical pin 246 by the interposition of a suitable bearing is taken to the horizontal plate 247 which is integral with girder 201. On plate 247 there are secured the supports 248 and 249 of shaft 250, on which shaft there are keyed the toothed wheels 251 and 252. The wheel 251 through chain 253 receives motion from the power take-off P of tractor T, whereas the other wheel 252 at a suitable ratio is coupled to gearing 254 which operates pump 224. The shaft 250 is substantially horizontal and parallel to the plane of a centre line longitudinally to tractor. On the head directed toward the front of the tractor there is applied a universal joint 255 which through shaft 256 and the universal joint 257 operates the axis of the conical wheel 242 meshing with the conical wheel 241 already disclosed.

If the tractor should not be provided with the lifting device according to the improvements as shown in FIGURES 4 and 5 of the drawings, the lifting movement from the soil of arm 210 carrying the implement 236 may be achieved by inserting through an adequate articulation between the structure of frame 203 and arm 208 a cylinder 258, in which there slides a piston whose rod 259 is hinged to the fork of arm 208. Rod 259 in the cylinder 258 is caused to move by introducing into the said cylinder the compressed fluid supplied by a conduit and distributed by operating lever 261 of the distributor 260 provided alongside the driver's seat.

The telescopic sliding movement of the end within the tube 210 is set free or locked by operating the lever 262 which clamps the collar 263 on the cylinder 210 by the aid of a slot 264 intended to accommodate the collar 263.

The operation of the device has been clearly set forth hereinbefore by explaining the working of each component part.

The advantages offered by putting into effect the invention, as compared with the known art, may be resumed as follows:

(a) The implement appears to be arranged alongside and in an advanced position with respect to the driver of the supporting and towing means, thus permitting the driver to watch the run and the work continuously and without any difficulty of a visual nature;

(b) The hydraulic control operating the implement carrying arm has to perform only a very short stroke, so as to warrant a minimum wear and a satisfactory operation;

(c) The arrangement of the fulcrum of the arm in a rear or front position with respect to the tractor, combined with the possibility of extending said arm to obtain big displacements of the implement laterally to the direction of run;

(d) The transmission of motion of the implement is performed by means of a splined shaft provided with extensions of different length, so as to fit the whole system to the distance existing between the rows.

The invention has been described and illustrated by way of example only, without any limitation. Of course, it may undergo such modifications as may be suggested by the art and by putting it into effect, without thereby departing from the ambit of the invention itself.

What we claim is:

1. In combination with a vehicle adapted for ground traversing movement normally along its longitudinal axis, an attachment carried by said vehicle comprising a rigid frame fixedly supported by said vehicle, said frame having a portion projecting rearwardly from the vehicle, a rigid arm pivotally connected to said portion for swinging movement about a vertical axis, said arm projecting forwardly from said pivotal connection and diverging at an acute angle from the said longitudinal axis of the vehicle, an extension of said arm projecting rearwardly from said pivotal connection, said arm terminating forwardly in a free end displaced laterally to one side of the vehicle, an hydraulic ram connected at one end to said extension of said arm and at the other end to said portion of said frame extending rearwardly from said vehicle and normally maintaining said arm in its said position at an acute angle to the longitudinal axis of the vehicle, said hydraulic ram being selectively operative to retract said arm inwardly toward the vehicle, an implement carried at the free end of the arm normally in laterally spaced relation to one side of the vehicle, and a resiliently forwardly projected feeler carried at the free end of the arm normally in advance of the implement, said hydraulic ram including a control valve, and operative connections between said control valve and said feeler for operating said hydraulic ram to swing said arm and implement laterally inwardly toward the vehicle.

2. The combination as defined in claim 1 in which said hydraulic ram is adjustably connected at at least one end whereby the stroke of said arm may be adjusted.

3. The combination as defined in claim 1 wherein said implement is of the power-driven type, and including a source of power on said vehicle and drive transmitting means for transmitting power from said power source to the implement, said drive transmitting means including a first drive shaft extending longitudinally forwardly from said power source and a second drive shaft operatively connected through a set of bevelled gears to said first drive shaft and extending laterally from said first drive shaft to said implement said first and second drive shafts, each including universal joints at both ends.

References Cited by the Examiner

UNITED STATES PATENTS

| | | | |
|---|---|---|---|
| 1,570,415 | 1/26 | Sumbulian | 172—6 |
| 1,912,706 | 6/33 | Goodman | 172—38 |
| 2,694,355 | 11/54 | Pertics et al. | 172—117 |
| 2,748,679 | 6/56 | Rogers | 172—117 X |
| 2,749,824 | 6/56 | Friday | 172—38 X |
| 2,756,654 | 7/56 | Porterfield et al. | 172—98 |
| 2,791,081 | 5/57 | Allen et al. | 172—99 X |
| 2,974,469 | 3/61 | Smith et al. | 172—79 X |
| 3,005,500 | 10/61 | Lamouria | 172—6 |
| 3,006,420 | 10/61 | Coogan | 172—38 X |
| 3,066,745 | 12/62 | Smith et al. | 172—59 |

ABRAHAM G. STONE, *Primary Examiner.*

A. JOSEPH GOLDBERG, *Examiner.*